(12) United States Patent
Hua et al.

(10) Patent No.: US 9,251,470 B2
(45) Date of Patent: Feb. 2, 2016

(54) INFERRED IDENTITY

(71) Applicants: Zhigang Hua, Fremont, CA (US); Kin Kan, Mountain View, CA (US); Peter N. Skomoroch, San Francisco, CA (US); Gloria Lau, Los Altos, CA (US); Saveliy Uryasev, Sunnyvale, CA (US)

(72) Inventors: Zhigang Hua, Fremont, CA (US); Kin Kan, Mountain View, CA (US); Peter N. Skomoroch, San Francisco, CA (US); Gloria Lau, Los Altos, CA (US); Saveliy Uryasev, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/292,779

(22) Filed: May 30, 2014

(65) Prior Publication Data

US 2015/0347917 A1    Dec. 3, 2015

(51) Int. Cl.
*G06N 5/04* (2006.01)
*G06N 99/00* (2010.01)

(52) U.S. Cl.
CPC ............. *G06N 5/048* (2013.01); *G06N 99/005* (2013.01)

(58) Field of Classification Search
None
See application file for complete search history.

(56) References Cited

U.S. PATENT DOCUMENTS

| 7,945,522 | B2 | 5/2011 | Mcgovern et al. | |
|---|---|---|---|---|
| 8,036,931 | B2 * | 10/2011 | Hale et al. | 705/14.1 |
| 8,060,451 | B2 | 11/2011 | Degeratu et al. | |
| 8,224,756 | B2 | 7/2012 | Roberts et al. | |
| 8,402,040 | B2 * | 3/2013 | Mallalieu et al. | 707/758 |
| 8,494,914 | B2 | 7/2013 | Mesaros | |
| 8,650,177 | B2 | 2/2014 | Skomoroch et al. | |
| 8,661,034 | B2 | 2/2014 | Polonsky et al. | |
| 2005/0015432 | A1 | 1/2005 | Cohen | |
| 2005/0055450 | A1 * | 3/2005 | Gang | 709/228 |
| 2006/0004716 | A1 * | 1/2006 | Hurst-Hiller et al. | 707/3 |
| 2006/0184464 | A1 | 8/2006 | Tseng et al. | |
| 2006/0218111 | A1 | 9/2006 | Cohen | |
| 2007/0202475 | A1 | 8/2007 | Habichler et al. | |
| 2008/0065481 | A1 | 3/2008 | Immorlica et al. | |

(Continued)

OTHER PUBLICATIONS

"U.S. Appl. No. 13/357,171, Non Final Office Action mailed Jun. 17, 2013", 9 pgs.

(Continued)

*Primary Examiner* — Ben Rifkin
*Assistant Examiner* — Mai T Tran
(74) *Attorney, Agent, or Firm* — Schwegman Lundberg & Woessner, P.A.

(57) ABSTRACT

Techniques for modifying search results associated with a search request based on a determination that a member profile attribute is inaccurate are described. According to various embodiments, an existing member profile attribute included in a member profile page of a particular member of an online social network service is identified. Member profile data and behavioral log data associated with a plurality of members of the online social network service is then accessed. Prediction modeling to verify the existing member profile attribute is performed using the accessed data. Additionally, a confidence score associated with the existing member profile attribute is generated based on the prediction modeling. Moreover, the existing member profile attribute is determined to be inaccurate based on the generated confidence score. Furthermore, the search results associated with a search request is modified based on the determination.

12 Claims, 9 Drawing Sheets

(56) References Cited

U.S. PATENT DOCUMENTS

| | | |
|---|---|---|
| 2008/0172415 A1 | 7/2008 | Fakhari et al. |
| 2008/0313000 A1 | 12/2008 | Degeratu et al. |
| 2009/0006193 A1 | 1/2009 | Forbes et al. |
| 2009/0112796 A1* | 4/2009 | Elder ............................... 707/2 |
| 2009/0222303 A1* | 9/2009 | Higgins et al. .................... 705/7 |
| 2010/0057597 A1 | 3/2010 | Vilrokx |
| 2011/0040586 A1* | 2/2011 | Murray et al. .................... 705/7 |
| 2011/0238591 A1 | 9/2011 | Kerr et al. |
| 2011/0258042 A1 | 10/2011 | Purvy et al. |
| 2012/0023030 A1 | 1/2012 | Jeffries |
| 2012/0095933 A1 | 4/2012 | Goldberg |
| 2012/0110071 A1* | 5/2012 | Zhou et al. .................... 709/204 |
| 2012/0117036 A1 | 5/2012 | Lester et al. |
| 2012/0197733 A1* | 8/2012 | Skomoroch et al. ....... 705/14.66 |
| 2012/0197863 A1 | 8/2012 | Skomoroch et al. |
| 2012/0197906 A1 | 8/2012 | Landau et al. |
| 2012/0197993 A1 | 8/2012 | Skomoroch et al. |
| 2012/0259791 A1 | 10/2012 | Zoidze |
| 2012/0311462 A1 | 12/2012 | Devecka |
| 2013/0159325 A1 | 6/2013 | Polonsky et al. |
| 2013/0212032 A1 | 8/2013 | Cox et al. |
| 2013/0218965 A1 | 8/2013 | Abrol et al. |
| 2013/0282811 A1* | 10/2013 | Lessin et al. ................... 709/204 |
| 2014/0025427 A1* | 1/2014 | Bastian et al. ................ 705/7.29 |
| 2014/0081928 A1 | 3/2014 | Skomoroch et al. |
| 2014/0129631 A1 | 5/2014 | Jayaram et al. |
| 2014/0143324 A1 | 5/2014 | Lessin |
| 2014/0181193 A1* | 6/2014 | Narasimhan et al. ......... 709/204 |
| 2014/0279722 A1* | 9/2014 | Singh et al. ..................... 706/11 |

OTHER PUBLICATIONS

"U.S. Appl. No. 13/357,171, Notice of Allowance mailed Oct. 1, 2013", 10 pgs.
"U.S. Appl. No. 13/357,171, Response filed Sep. 17, 2013 to Non Final Office Action mailed Jun. 17, 2013", 12 pgs.
"U.S. Appl. No. 13/357,360, Final Office Action mailed Jun. 27, 2013", 22 pgs.
"U.S. Appl. No. 13/357,360, Non Final Office Action mailed Oct. 11, 2012", 13 pgs.
"U.S. Appl. No. 13/357,360, Response filed Mar. 18, 2013 to Non Final Office Action mailed Oct. 11, 2012", 17 pgs.
"U.S. Appl. No. 13/357,360, Response filed Nov. 20, 2013 to Final Office Action mailed Jun. 27, 2013", 18 pgs.
"U.S. Appl. No. 13/672,377, Non Final Office Action mailed Dec. 4, 2014", 9 pgs.
"U.S. Appl. No. 14/072,955, Final Office Action mailed Nov. 12, 2014", 11 pgs.
"U.S. Appl. No. 14/072,955, Non Final Office Action mailed May 9, 2014", 11 pgs.
"U.S. Appl. No. 14/072,955, Preliminary Amendment filed Dec. 10, 2013", 10 pgs.
"U.S. Appl. No. 14/072,955, Response filed Aug. 11, 2014 to Non Final Office Action mailed May 9, 2014", 14 pgs.
"International Application Serial No. PCT/US2013/068763, International Search Report mailed May 2, 2014", 2 pgs.
"International Application Serial No. PCT/US2013/068763, Written Opinion mailed May 2, 2014", 5 pgs.
Ackerman, Mark, "Sharing Expertise: Beyond Knowledge Management", The MIT Press (Cambridge, Massachusetts), (2003), 438 pgs.
Becerra-Fernandez, Irma, "Searching for Experts on the Web: A Review of Contemporary Expertise Locator Systems", ACM Transactions on Internet Technology 6(4), (Nov. 2006), 333-355.
D'Amore, Raymond, "Expertise Community Detection", SIGIR, (Jul. 25-29, 2004), 498-499.
Dom, Byron, et al., "A Bayesian Technique for Estimating the Credibility of Question Answerers", SIAM, (2008), 399-409.
Dom, Byron, et al., "Graph-Based Ranking Algorithms for E-mail Expertise Analysis", DMKD, (Jun. 13, 2003), 42-48.
Fu, Yupeng, et al., "Finding Experts Using Social Network Analysis", IEEE/WIC/ACM International Conference on Web Intelligence, (2007), 77-80.
Grolmus, Petr, et al., "A Web-Based User-Profile Generator: Foundation for a Recommender and Expert Finding System", 8th ICCC International Conference on Electronic Publishing, (Jun. 2004), 331-342.
Haselmann, Till, et al., "Towards a Conceptual Model for Trustworthy Skills Profiles in Online Social Networks", ERCIS, (2010), 13 pgs.
Huh, Eui-Nam, et al., "A Framework of Online Community based Expertise Information Retrieval on Grid", Kyung Hee University Memo, (Aug. 11, 2008), 21 pgs.
Huh, Eui-Nam, et al., "A Framework of Online Community based Expertise Information Retrieval on Grid", Kyung Hee University Memo, (Jan. 14, 2010), 21 pgs.
John, Ajita, et al., "Collaborative Tagging and Expertise in the Enterprise", WWW2006, (May 22-26, 2006), 6 pgs.
Li, Juanzi, et al., "EOS: Expertise Oriented Search Using Social Networks", WWW 2007 / Poster Paper, (May 8-12, 2007), 1271-1272.
Lin, Ching-Yung, et al., "SmallBlue: Social Network Analysis for Expertise Search and Collective Intelligence", IEEE International Conference on Data Engineering, (2009), 1483-1486.
Malek, Maria, et al., "Exhaustive and Guided Algorithms for Recommendation in a Professional Social Network", EISTI-Laris laboratory, PRES Cergy University, (Jul. 31, 2010), 19 pgs.
Meyer, Bertolt, et al., "skillMap: dynamic visualization of shared organizational context", Institute of Information Systems, Humboldt University Berlin, (Feb. 20, 2006), 13 pgs.
Pretschner, Alexander, "Ontology Based Personalized Search", Department of Electrical Engineering and Computer Science, University of Kansas, (1998), 125 pgs.
Stankovic, Milan, et al., "Looking for Experts? What can Linked Data do for you?", LDOW, (Apr. 27, 2010), 10 pgs.
Steggles, Andy, "Keeping Score of Your Online Member Engagement", Associations Now, [Online]. Retrieved from the Internet: <URL: http://www.asaecenter.org/Resources/ANowDetail.cfm?ItemNumber=3828>, (Jan. 2009), 7 pgs.
Tang, Jie, et al., "ArnetMiner: An Expertise Oriented Search System for Web Community", International Semantic Web Conference—ISWC, (2007), 8 pgs.
Yimam-Seid, Dawit, et al., "Expert Finding Systems for Organizations: Problem and Domain Analysis and the DEMOIR Approach", Journal of Organizational Computing and Electronic Commerce 13(1), (2003), 1-24.
Zhang, Jing, et al., "Expert Finding in a Social Network", Department of Computer Science and Technology, Tsinghua, University Database Systems for Advanced Applications—DASFAA, (2007), 1066-1069.
"International Application Serial No. PCT/US2015/020289, International Search Report mailed Jun. 22, 2015", 2 pgs.
"International Application Serial No. PCT/US2015/020289, Written Opinion mailed Jun. 22, 2015", 6 pgs.

\* cited by examiner

INFERRED IDENTITY

TECHNICAL FIELD

The present application relates generally to data processing systems and, in one specific example, to techniques for modifying search results associated with a search request based on a determination that a member profile attribute is inaccurate.

BACKGROUND

Online social network services such as LinkedIn® offer a variety of products and services to millions of members. Typically, each member of the online social network service may maintain a member profile page that includes various information (or member profile attributes) associated with the member, such as a member photo, employment information, educational information, title, skills, geographic location, etc.

BRIEF DESCRIPTION OF THE DRAWINGS

Some embodiments are illustrated by way of example and not limitation in the figures of the accompanying drawings in which.

DETAILED DESCRIPTION

Figure 1:
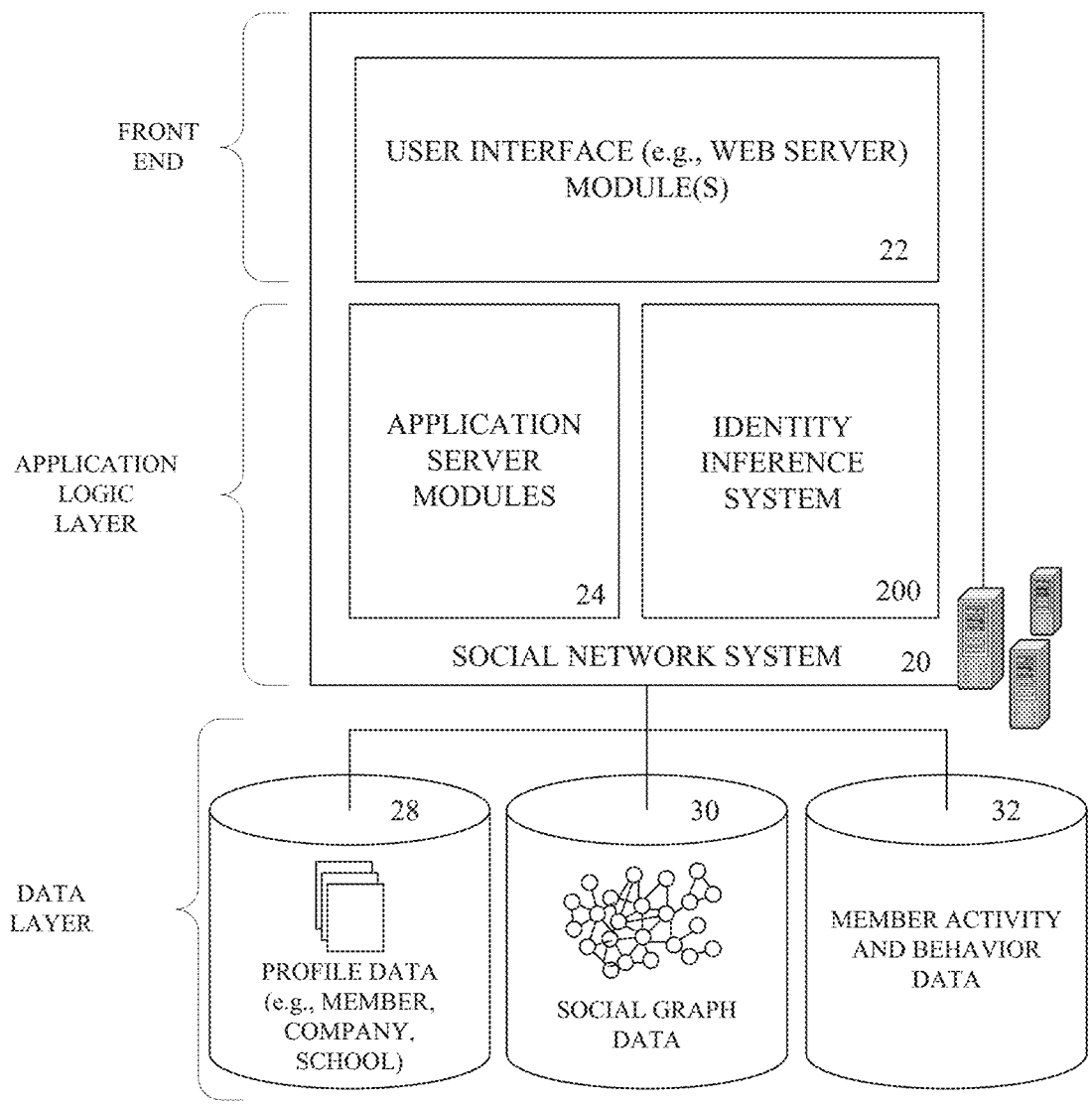
FIG. 1 is a block diagram showing the functional components of a social networking service, consistent with some embodiments of the invention.

Example methods and systems for inferring the identity (e.g., member profile attributes) of members of an online social network service are described. In the following description, for purposes of explanation, numerous specific details are set forth in order to provide a thorough understanding of example embodiments. It will be evident, however, to one skilled in the art that the present invention may be practiced without these specific details.

According to various example embodiments, an identity inference system is configured to infer missing member profile attributes associated with a member of an online social network service. For example, if a member has a missing employer (e.g., company) attribute, educational (e.g., school) attribute, geographic location attribute, title attribute, skills attribute, etc., the system is configured to analyze the existing data (e.g., member profile data and behavioral log data) associated with that member, as well as existing data of other members of the online social network, in order to infer a value for the missing member profile attribute.

For example, in some embodiments, the system may access member profile data and behavioral log data associated with members of the online social network service, the behavioral log data indicating interactions by the members with one or more products of the online social network service. As described in more detail below, the system may then input one or more features extracted from the member profile data and/or behavioral log data into a computer-based prediction model, such as a logistic regression model, and perform a prediction modeling process based on the feature data to generate a confidence score associated with a missing member profile attribute of a particular member, the confidence score indicating a likelihood that the missing member profile attribute corresponds to a candidate value. If the confidence score is greater than a predetermined value, then the system may determine that the missing member profile attribute likely corresponds to that candidate value Non-limiting examples of member profile attributes that may be inferred include name, title, industry, geographic location, country, region, contact information, e-mail address, gender, current employer, previous employer, current educational institution, previous educational institution, degree, field of study, skills, recommendations, endorsements, company size, seniority level, and so on. Non-limiting examples of behavioral log data include any information indicating how a member interacts with online content (e.g., an online social network service website and any webpages and products associated therewith). For example, in the case of the online social network service LinkedIn®, the behavioral log data of members includes information indicating when the member logged into the site, how long the member remained on the site, what was displayed to them, what they viewed, impressions, what they clicked on, social activity information (e.g., what they liked, shared, followed, posted, commented on, etc.), products that they interacted with (e.g., a content feed or network update stream (NUS), member profile pages of other members, a people you may know (PYMK) product, a Jobs You May Be Interested In (JYMBII) product, a company page, a group page, an influencer page, a University/school page, etc.), geolocation information (received from a mobile device of the member), computing platform information (e.g., whether the member accessed the site via desktop or mobile device), IP address information (e.g., the IP addresses associated with login requests to login to the website that were received from the member), member connections of the member, invitations sent by the member, address book or contact information uploads by the member to the site, and so on.

The system may take into account any combination of feature data described above (e.g., the aforementioned member profile data and behavioral log data) in order to determine a probability or "confidence score" indicating the likelihood that a missing member profile attributes of the particular member corresponds to a candidate value. As described above, the system may perform computer-based prediction modeling, using one or more computer-based prediction models (e.g., statistical machine learning models), in order to generate the aforementioned confidence score. Examples of prediction models include a logistic regression model, a gradient-boosted machine (GBM) model, a Naïve Bayes model, a support vector machines (SVM) model, a decision trees model, and a neural network model.

In some embodiments, a prediction model may be trained based on feature data (e.g., member profile data, behavioral log data, etc.) associated with members having a known candidate value for a member profile attribute (e.g., members listing a particular school such as Stanford, or a particular employer such as LinkedIn®, or a particular geographic location such as San Francisco Bay Area, or a particular title such as computer engineer, or a particular skill such as HTML, etc.). During the training process, statistical trends and patterns associated with these members having the known candidate value for the member profile attribute may be identified, and coefficients of the model may be trained and refined accordingly, such that the trained model reflects the relative weight, importance, or relevance of various features for the purposes of determining whether a specific member is also associated with that candidate value for that member profile attribute (e.g., whether a specific member went to Stanford). For example, the coefficients of the trained model may reflect that the attributes of email address domain and IP address have a high correlation to the member profile attribute of location, although they have a lower correlation to the member profile attribute of title, and so the coefficients in the model associated with the attributes of email address domain and IP address may be weight accordingly. Once trained, the prediction model may receive available features associated with a specific member (e.g., member profile data, social activity information, geolocation information, IP address login information, etc.) in order to determine the likelihood that a member profile attribute of this member corresponds to a given candidate value.

Since each member profile attribute may be associated with multiple candidate values (e.g., a company attribute could correspond to candidate values such as LinkedIn®, Google®, Apple®, etc.), the system may generate multiple confidence scores associated with multiple candidate values, each confidence score indicating the likelihood that that candidate value equates to the missing member profile attribute of a member. In some example embodiments, the system may rank the candidate values based on the confidence scores in order to determine that the member likely works at the highest ranked candidate value. Instead or in addition, the system may determine whether one or more of the candidate values are greater than a predetermined threshold, as described above. In some example embodiments, a specific prediction model may be trained for each type of member profile attribute (e.g., a trained model for the attribute of company, a trained model for the attribute of university, etc.). Moreover, in some embodiments, a specific prediction model may be trained for each specific candidate value associated with a member profile attribute (e.g., a trained model for the candidate value of LinkedIn® for the company attribute, a trained model for the candidate value of Google® for the company attribute, etc.).

An example of a specific feature that may be included in the feature data includes member connection information identifying member connections of each member of a social network. For example, when inferring whether John Smith works at LinkedIn®, the system may determine that if a large number of the member connections of John Smith work at LinkedIn®, it is more likely that John Smith also works at LinkedIn®. For example, a prediction model may be trained on member profile data and behavioral log data of members that work at LinkedIn® and determine that such members tend to have a large number of member connections that work at LinkedIn®, and perhaps a relatively smaller number of member connections that work at other companies. Similarly, the prediction model may be trained on member profile data and behavioral log data of members that work at Google@ and determine that, for example, these members tend to have a small number of member connections that work at LinkedIn®, and perhaps a relatively larger number of member connections that work at Google®, and so on. Accordingly, when training the prediction model on data of members associated with a known candidate value (e.g., members that work at LinkedIn®), the system may include, in a feature vector associated with each particular member, a numerical value indicating the number of member connections of that particular member that share the same company as the candidate company (e.g., the number of member connections that work at LinkedIn®). Likewise, when later utilizing the prediction model to generate a confidence score associated with John Smith having a particular candidate value (e.g., LinkedIn®), the system may include, in a feature vector of feature data associated with John Smith, a numerical value indicating the number of member connections of John Smith that share the same company as the candidate company (e.g., the number of member connections that work at LinkedIn®). In this non-limiting example, the greater this numerical value, the greater the confidence score generated by the prediction model. Likewise, member connection information may be utilized in a similar manner when inferring other attributes, such as location, school, title, skills, etc. For example, when inferring location attributes, the system may utilize a feature indicating how many member connections of a given member share the same country/region as the candidate country/region.

Another example of a specific feature that may be included in the feature data includes IP address information identifying IP addresses associated with login requests by the members of the online social network. For example, the system may infer that members who log in from the same/similar IP address tend to work at the same company. Accordingly, the system may include, in a feature vector of feature data associated with a given member, a numerical value indicating an IP address used by that member to login to a website, or a numerical value indicating how members having the same/similar IP address as the given member share the same company as the candidate company. Likewise, IP address information may be utilized in a similar manner when inferring other attributes, such as location, school, title, skills, etc. For example, when inferring location attributes, the system may utilize a feature indicating how many members associated with the same IP address as the given member share the same country/region as the candidate country/region.

Another example of a specific feature that may be included in the feature data includes profile view information identifying profile views by members of the online social network. For example, the system may determine that if member profile X is frequently viewed by the same members that view member profile Y (such that Y is termed a "co-viewed profile" of X and vice versa), then the member X and member Y likely work together. Accordingly, the system may include, in a feature vector of feature data associated with a given member, a numerical value indicating how many co-viewed profiles of that member share the same company as the candidate company (e.g., people that view this member frequently view a certain number of other members working at LinkedIn®). In this non-limiting example, the greater this numerical value, the greater the confidence score generated by the prediction model. Likewise, profile view information may be utilized in a similar manner when inferring other attributes, such as location, school, title, skills, etc. For example, when inferring location attributes, the system may utilize a feature indicating how many co-viewed profiles of that member share the same country/region as the candidate country/region.

Another example of a specific feature that may be included in the feature data includes email domain information identifying email domains associated with the members of the online social network. For example, the system may infer that members who sign up for a social network account with the same email domain (e.g., LinkedIn®.com) tend to work at the same company (e.g., LinkedIn®). Accordingly, the system may include, in a feature vector of feature data associated with a given member, a numerical value indicating an email domain used by that member to sign up for an account on a website, or a numerical value indicating how members associated with the same email domain as the member share the same company as the candidate company. Likewise, email domain information may be utilized in a similar manner when inferring other attributes, such as location, school, title, skills, etc.

Another example of a specific feature that may be included in the feature data includes invitation information identifying invitations transmitted by the members of the online social network. For example, when inferring whether John Smith works at LinkedIn®, the system may determine that if John Smith has transmitted a large number of invitations to other members that work at LinkedIn®, it is more likely that John Smith also works at LinkedIn®. Accordingly, the system may include, in a feature vector of feature data associated with a given member, a numerical value indicating the number of member invitations sent by that particular member to others that share the same company as the candidate company (e.g., members that work at LinkedIn®). Likewise, invitation information may be utilized in a similar manner when inferring other attributes, such as location, school, title, skills, etc.

Another example of a specific feature that may be included in the feature data includes address book information identifying records in address books associated with members of the online social network. For example, the system may infer that, if a member uploads an address book that includes a large number of users that work at LinkedIn®, it is more likely that the member also works at LinkedIn®. Accordingly, the system may include, in a feature vector of feature data associated with a given member, a numerical value indicating the number of users in an address book uploaded by that particular member that share the same company as the candidate company (e.g., users that work at LinkedIn®). As another example, the system may infer that, if a particular member frequently co-occurs in address books with others that work at LinkedIn®, then that particular member likely also works at LinkedIn®. Accordingly, the system may include, in a feature vector of feature data associated with a given member, a numerical value indicating how many times that member has co-occurred (in one or more address books) with at least one user that shares the same company as the candidate company, or how many times they have co-occurred with a specific user works at the candidate value company, and so on. As another example, the system may count how many times a member appears in address books of members who work at the candidate company. For example, the system may determine that if someone appears very often in address books of LinkedIn® employees, he/she is more likely to have worked at LinkedIn®. Accordingly, the system may include, in a feature vector of feature data associated with a given member, a numerical value indicating how many times that member has appeared in address books of users who work at the candidate company. Likewise, address book information may be utilized in a similar manner when inferring other attributes, such as location, school, title, skills, etc.

Another example of a specific feature that may be included in the feature data includes alumni group membership information, associated with the members of the online social network. For example, the system may infer that members who join the same alumni group (e.g., Stanford Alumni) tend to graduate from the same school (e.g., Stanford). Accordingly, the system may include, in a feature vector of feature data associated with a given member, a numerical value indicating the number of members that attended a candidate school that have joined a group that the given member has joined. Likewise, group membership information may be utilized in a similar manner when inferring other attributes, such as location, company, title, skills, etc.

Another example of a specific feature that may be included in the feature data includes geographic location information (e.g., city, state, country, region, etc.) of the members of the online social network. For example, the system may infer that if a member has specified that they are in a given country or region (e.g., when they signed up for an account on the online social network service), then they likely attend a school in that country or region, and they likely do not attend a school in some other country or region. Accordingly, the system may include, in a feature vector of feature data associated with a given member, a numerical value indicating a country or region (e.g., as specified by the member when they signed up for an account on the online social network service). Likewise, geographic location information may be utilized in a similar manner when inferring other attributes, such as location, company, title, skills, etc.

Another example of a specific feature that may be included in the feature data includes gender distribution information of the members of the online social network. For example, if the system determines that the member is male, it is less likely that they attend a female-only school (or a school where most members are female). Accordingly, the system may include, in a feature vector of feature data associated with a given member, a numerical value indicating the number of a number or proportion of members having the same gender as the given member at the candidate school. Likewise, gender distribution information may be utilized in a similar manner when inferring other attributes, such as location, company, title, skills, etc.

Another example of a specific feature that may be included in the feature data includes industry information associated with the members of the online social network. For example, the system may infer that members who have the same industry attribute (e.g., Music Industry) tend to graduate from same or similar schools. Accordingly, the system may include, in a feature vector of feature data associated with a given member, a numerical value indicating the number of members having the same industry attribute as the given member that attended the candidate school. Likewise, industry information may be utilized in a similar manner when inferring other attributes, such as location, company, title, skills, etc.

In some embodiments, the system may infer title in conjunction with inferring company. For example, title and company are often related attributes that are specified by the member in conjunction with each other. In some embodiments, the system may infer the title of a given member by first inferring a company of the given member (e.g., using any embodiments described above), and then identifying a set of one or more first degree member connections of the given member who have worked at the inferred company. The system may then identify a first one of that set of members that is "most similar" to the given member, by comparing the skills of that first member with the skills (either known or inferred) of the given member. The system may then infer that the title of the given member corresponds to the title of the first member.

Various examples above describe features and/or numerical values being inserted into feature vectors, and such features and/or numerical values may represent a count over a particular period of time (e.g., a particular week, a group of weeks, a particular month, a group of months, etc.). For example, when inferring location attributes, the system may utilize a feature indicating how many members associated with the same/similar IP address as the given member share the same country/region as the candidate country/region. Thus, this feature may include a count of how many members have logged into a website based on that same/similar IP address during a particular week, a group of weeks, a particular month, a group of months, etc.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an identity inference system 200. The identity inference system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
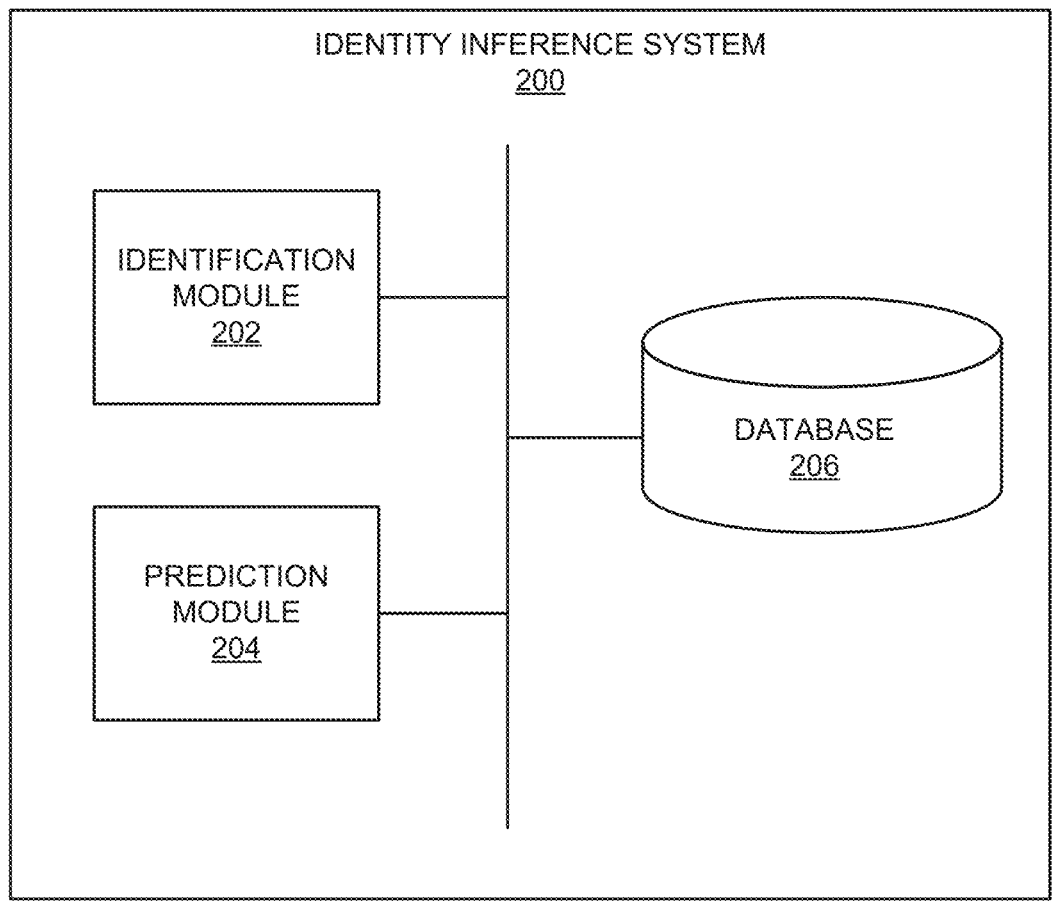
FIG. 2 is a block diagram of an example system, according to various embodiments.

Turning now to FIG. 2, an identity inference system 200 includes a determination module 202, a request generation module 204, and a database 206. The modules of the identity inference system 200 may be implemented on or executed by a single device such as an inferred identity device, or on separate devices interconnected via a network. The aforementioned inferred identity device may be, for example, one or more client machines or application servers. The operation of each of the aforementioned modules of the identity inference system 200 will now be described in greater detail in conjunction with FIG. 3.

Figure 3:
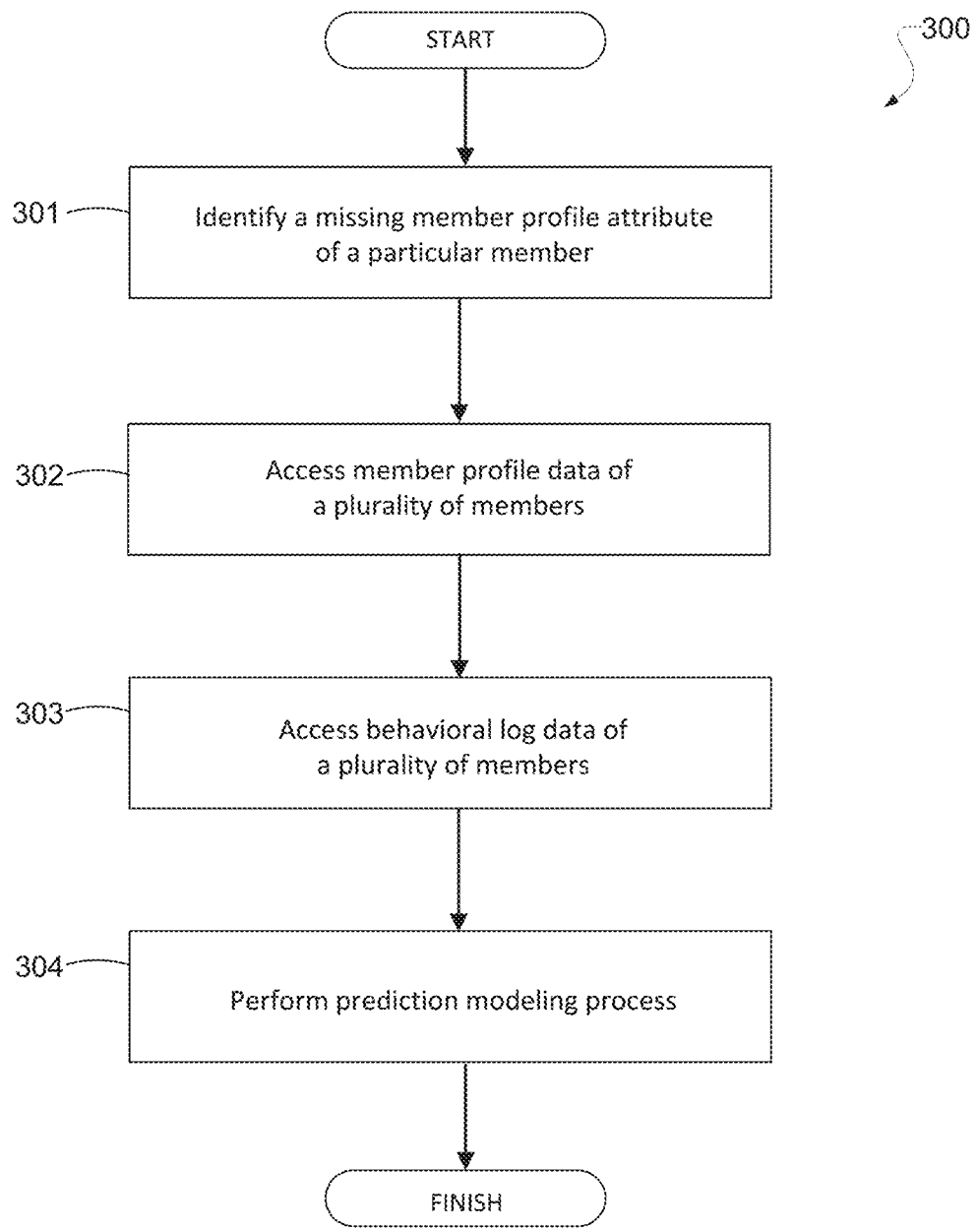
FIG. 3 is a flowchart illustrating an example method, according to various embodiments.

FIG. 3 is a flowchart illustrating an example method 300, according to various example embodiments. The method 300 may be performed at least in part by, for example, the identity inference system 200 illustrated in FIG. 2 (or an apparatus having similar modules, such as one or more client machines or application servers). In operation 301 in FIG. 3, the identification module 202 identifies a member profile attribute missing from a member profile page associated with a particular member of an online social network service. In some embodiments, the missing member profile attribute corresponds to at least one of a geographic location, an educational attribute, an employer attribute, a title, and a skill. In operation 302 in FIG. 3, the prediction module 204 accesses member profile data associated with a plurality of members of the online social network service. The member profile data may be stored in the database 206. In operation 303 in FIG. 3, the prediction module 204 accesses behavioral log data associated with the members, the behavioral log data indicating interactions by the members with one or more products of the online social network service. The behavioral log data may be stored in the database 206. In operation 304 in FIG. 3, the prediction module 204 performs prediction modeling, based on a prediction model and feature data including the member profile data and the behavioral log data, to generate a confidence score associated with the particular member and the missing member profile attribute, the confidence score indicating a likelihood that the missing member profile attribute corresponds to a candidate value. In some embodiments, the confidence score may be a numerical number within a predetermined range (e.g., a number within the range of 0 to 1, or a number within the range of 0 to 100, etc.). In some embodiments, the prediction model is any one of a logistic regression model, a gradient-boosted machine (GBM) model, a Naïve Bayes model, a support vector machines (SVM) model, a decision trees model, and a neural network model.

Figure 4:
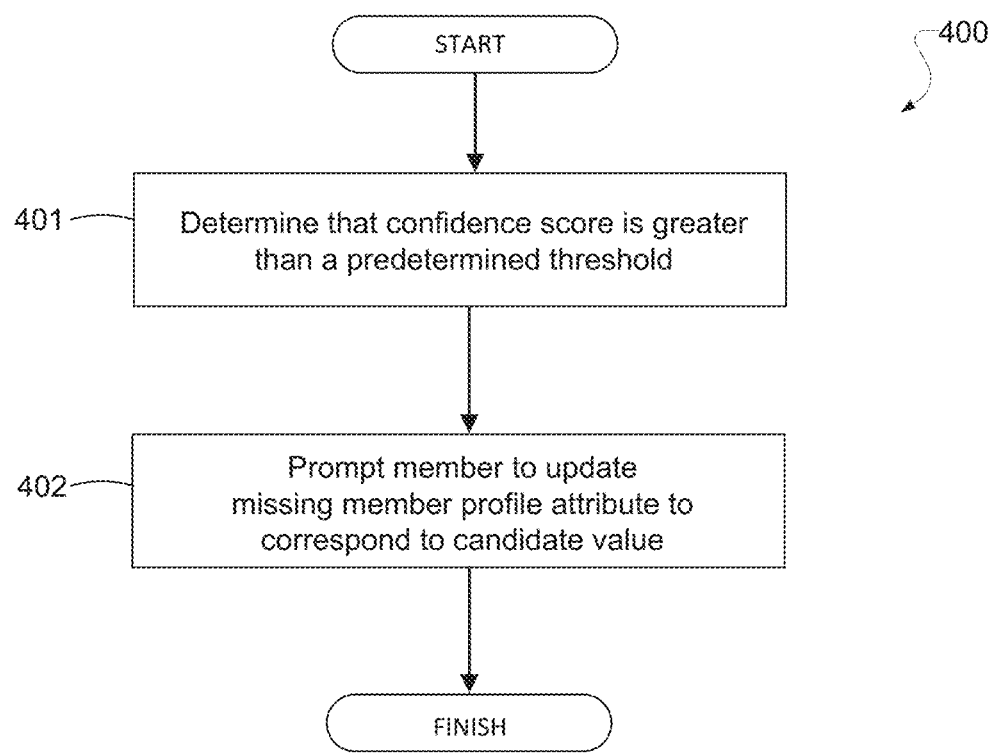
FIG. 4 is a flowchart illustrating an example method, according to various embodiments.

FIG. 4 is a flowchart illustrating an example method 400, consistent with various embodiments described above. In some embodiments, the method 400 may be performed after the method 300 illustrated in FIG. 3. The method 400 may be performed at least in part by, for example, the identity inference system 200 illustrated in FIG. 2 (or an apparatus having similar modules, such one or more client machines or application servers). In operation 401, the prediction module 204 determines that a confidence score (e.g., the confidence score generated in operation 304 in FIG. 3) is greater than a predetermined threshold (e.g., 0.5, 0.8, etc.). In operation 402, the prediction module 204 prompts a particular member associated with the confidence score to update a missing member profile attribute (e.g., the missing member profile attribute identified in operation 301 in FIG. 3) to correspond to a candidate value associated with the confidence score (e.g., see operation 304 in FIG. 3). In some embodiments, the prompting may comprise displaying, via a user interface, a prompt that invites the particular member to update the missing member profile attribute to correspond to the candidate value. In some embodiments, the prompting may comprise transmitting a message to the particular member that invites the particular member to update the missing member profile attribute to correspond to the candidate value. For example, the aforementioned message may correspond to an email, a text message, a social network instant message, and a chat message. It is contemplated that the operations of method 400 may incorporate any of the other features disclosed herein. Various operations in the method 400 may be omitted or rearranged, as necessary.

In some embodiments, before prompting a member to update a missing member profile attribute corresponding to a candidate value, the system may first determine whether or not that candidate value is already included in the member's profile page (e.g., in correspondence with another, existing member profile attribute). For example, suppose a particular member already has the employer LinkedIn® listed on their profile as a former employer, but the current employer attribute is missing. The identity inference system 200 may nevertheless infer that the member currently works at LinkedIn® (e.g., that the candidate value for the missing member profile attribute of current employer most likely corresponds to the employer LinkedIn®). However, the fact that the member has already listed LinkedIn® as a former employer will result in the system preventing the member from being prompted to update their current employer to LinkedIn®. Accordingly, in some embodiments, the system may analyze the member's profile page for various values (e.g., companies, universities, locations, titles, skills, etc.), and prevent those values from being sent as candidate values in the prediction modeling process. Instead or in addition, after the prediction modeling process is completed, the system may ignore any confidence scores associated with candidate values already included in the member's profile page.

Figure 5:
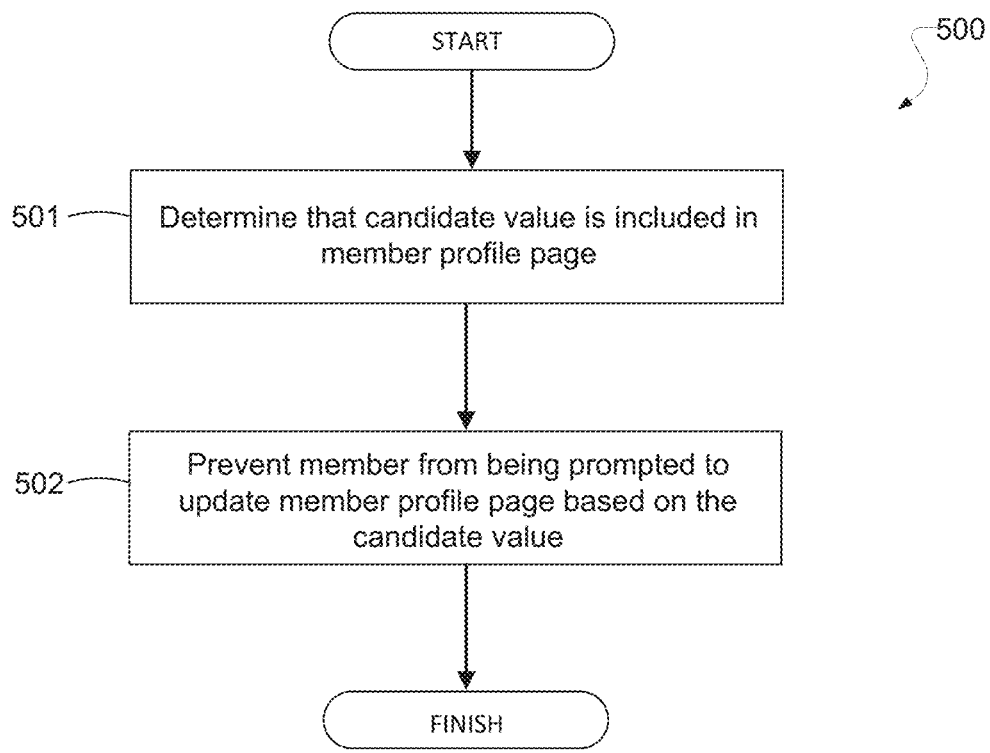
FIG. 5 is a flowchart illustrating an example method, according to various embodiments.

FIG. 5 is a flowchart illustrating an example method 500, consistent with various embodiments described above. The method 500 may be performed at least in part by, for example, the identity inference system 200 illustrated in FIG. 2 (or an apparatus having similar modules, such one or more client machines or application servers). In operation 501, the identification module 202 determines that a candidate value (e.g., output from a prediction modeling process) is associated with an existing member profile attribute included in a member profile page of a member. For example, the existing member profile attribute may be distinct from a missing member profile attribute in the member profile page (e.g., former employer vs. current employer). In operation 502, the prediction module 204 prevents the particular member from being prompted to update the missing member profile attribute to correspond to the candidate value. It is contemplated that the operations of method 500 may incorporate any of the other features disclosed herein. Various operations in the method 500 may be omitted or rearranged, as necessary.

In some embodiments, after the identity inference system 200 determines that a missing member profile attribute of the member corresponds to a candidate value (e.g., based on a confidence score being higher than a predetermined threshold, as described above), the system may modify various types of information to indicate that the missing member profile attribute of the member likely corresponds to the candidate value. For example, if the system determines that a missing employer attribute likely corresponds to a member working at LinkedIn®, and if the system receives a request for a list of members that work at LinkedIn® (or a search request for such members), then the system may include that member in the list of results (or indicate that the member should likely be included in the results). As another example, if the identity inference system 200 is generating a count of current employees of a particular employer such as LinkedIn® (e.g., to for the purposes of marketing and/or advertising), the system may increment this count to include the member.

Figure 6:
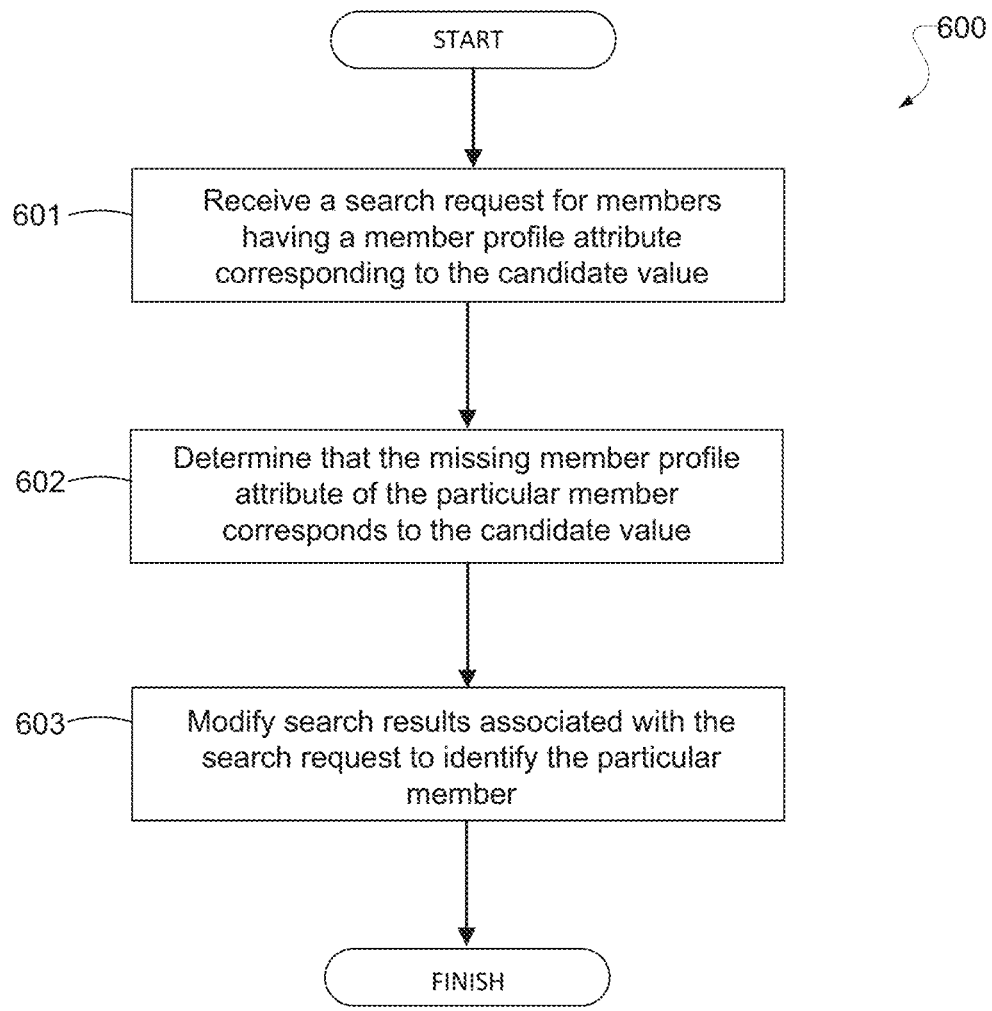
FIG. 6 is a flowchart illustrating an example method, according to various embodiments.

FIG. 6 is a flowchart illustrating an example method 600, consistent with various embodiments described above. The method 600 may be performed at least in part by, for example, the identity inference system 200 illustrated in FIG. 2 (or an apparatus having similar modules, such one or more client machines or application servers). In operation 601, the prediction module 204 receives a search request for members having a member profile attribute corresponding to a candidate value (e.g., search for members who work at LinkedIn®). In operation 602, the prediction module 204 determines that a missing member profile attribute of a particular member likely corresponds to the candidate value, based on a confidence score in the associated with the particular member and the candidate value. For example, the confidence score may be calculated in the operation 300 illustrated in FIG. 3 and may indicate a likelihood that a missing member profile attribute of the member corresponds to the candidate value (e.g., the member may have a missing employer attribute, and the confidence score associated with the candidate value of the employer LinkedIn® is greater than a predetermined threshold, thereby indicating that the member likely works at LinkedIn®). In operation 603, the prediction module 204 modifies search results associated with the search request that was received in operation 601 to include in and/or identify the particular member as having the member profile attribute corresponding to the candidate value (e.g., the search results may indicate that the member works at LinkedIn® or likely works at LinkedIn®). It is contemplated that the operations of method 600 may incorporate any of the other features disclosed herein. Various operations in the method 600 may be omitted or rearranged, as necessary.

According to various example embodiments, the identity inference system 200 may also provide various techniques for verifying or validating existing member profile attributes for a member. For example, the identity inference system 200 may identify a member profile attribute that is already included on a member's profile page (e.g., the member indicates that they work at Google®). The identity inference system 200 may then perform the prediction modeling process in a similar manner as in embodiments described above (e.g., in connection with FIG. 3) in order to generate various confidence score is associated with various candidate values for that member profile attribute. In this way, the system may determine, for example, that when the candidate value is set to the current value as specified by the user (e.g., LinkedIn®, and if the user-specified that they work at LinkedIn®), the generated confidence score is relatively quite low, indicating that the user likely doesn't work at LinkedIn®. Similarly, the identity inference system 200 may determine that, for example, the candidate value associated with some other employer (e.g., Apple®) is actually relatively high, indicating that the user likely works at Apple®. Accordingly, the identity inference system 200 allows for verification and validation of various member profile attributes included in a member's profile, such as geographic location, employer, University, to title, skills, etc.

In conjunction with the verification techniques described above, if the identity inference system 200 determines that an existing member profile attribute of the member is inaccurate (e.g., the member indicated that they work at Google®, when it seems likely that they work at Apple®), the identity inference system 200 may prompt the member, via web-based user interface, or via a mobile application, or a message (e.g., e-mail, text message, chat message, etc.), to update their member profile attribute accordingly. For example, the system may prompt the user to change their employer from Google® to Apple®.

In some embodiments, in conjunction with the verification techniques described above, after the identity inference system 200 determines that an existing member profile attribute of the member is likely not accurate, the system may modify various types of information to indicate that the missing member profile attribute of the member likely corresponds to the more accurate candidate value. For example, if a member indicated that they work at Google®), and the system determines that it is more likely that they work at Apple®, and if the system receives a request for a list of members that work at Apple® (or a search request for such members), then the system may include that member in the list of results (or indicate that the member should likely be included in the results). Likewise, if the system receives a request for a list of members that work at Google® (or a search request for such members), then the system may exclude that member in the list of results (or indicate that the member should likely not be included in the results). As another example, if the identity inference system 200 is generating a count of current employees at Apple® (e.g., to for the purposes of marketing and/or advertising), the system may increment this count to include the member, whereas the system may decrement the count for the employer Google®.

Figure 7:
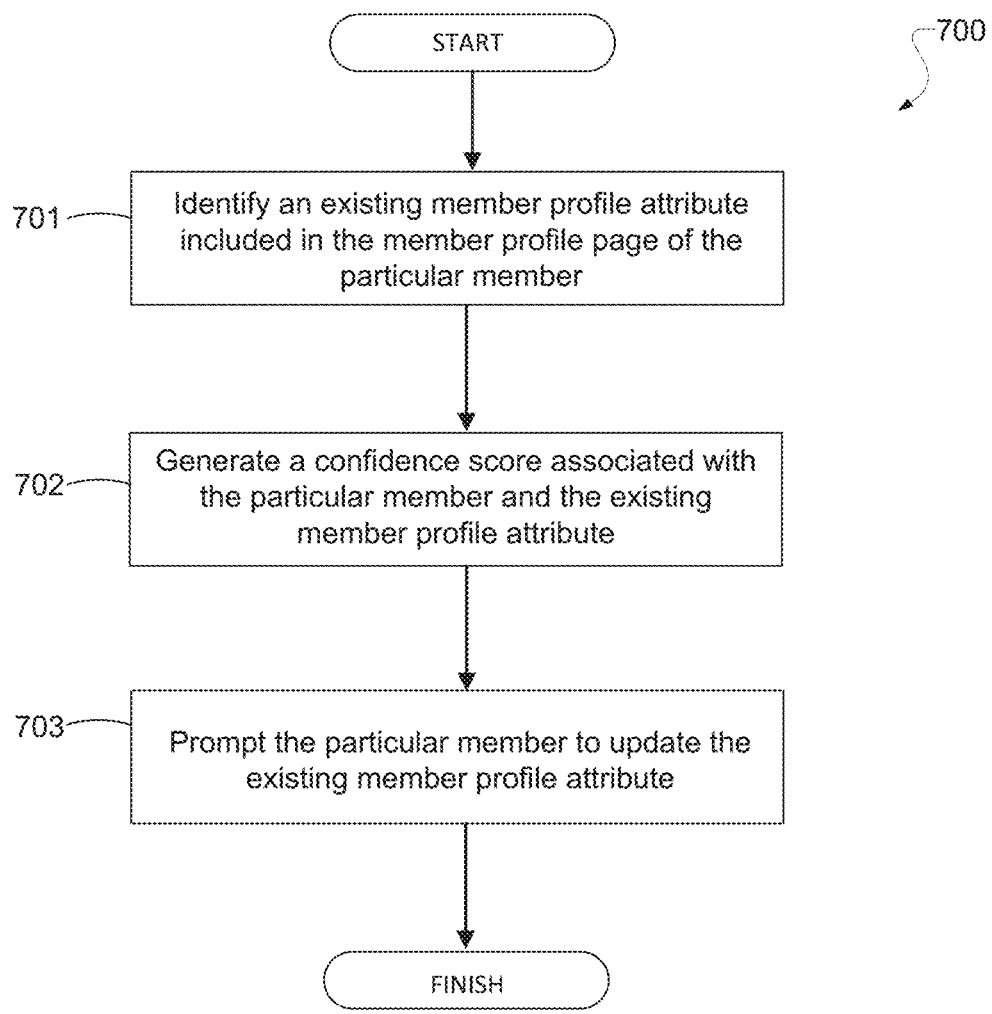
FIG. 7 is a flowchart illustrating an example method, according to various embodiments.

FIG. 7 is a flowchart illustrating an example method 700, consistent with various embodiments described above. The method 700 may be performed at least in part by, for example, the identity inference system 200 illustrated in FIG. 2 (or an apparatus having similar modules, such one or more client machines or application servers). In operation 701, the identification module 202 identifies an existing member profile attribute included in the member profile page of a particular member. In operation 702, the prediction module 204 generates a confidence score associated with the particular member and the existing member profile attribute, a confidence score indicating the likelihood that a new value distinct from a current value of the existing member profile attribute is accurate. In operation 703, the prediction module 204 prompts the particular member to update the existing member profile attribute to correspond to the new value, based on the confidence score. It is contemplated that the operations of method 700 may incorporate any of the other features disclosed herein. Various operations in the method 700 may be omitted or rearranged, as necessary.

Example Prediction Models

As described above, the prediction module 204 may use any one of various known prediction modeling techniques to perform the prediction modeling. For example, according to various exemplary embodiments, the prediction module 204 may apply a statistics-based machine learning model such as a logistic regression model to the member profile data and/or behavioral log data associated with one or more members of an online social network. As understood by those skilled in the art, logistic regression is an example of a statistics-based machine learning technique that uses a logistic function. The logistic function is based on a variable, referred to as a logit. The logit is defined in terms of a set of regression coefficients of corresponding independent predictor variables. Logistic regression can be used to predict the probability of occurrence of an event given a set of independent/predictor variables. A highly simplified example machine learning model using logistic regression may be $\ln[p/(1-p)]=a+BX+e$, or $[p/(1-p)]=\exp(a+BX+e)$, where ln is the natural logarithm, $\log_{exp}$, where $\exp=2.71828\ldots$, p is the probability that the event Y occurs, $p(Y=1)$, $p/(1-p)$ is the "odds ratio", $\ln[p/(1-p)]$ is the log odds ratio, or "logit", a is the coefficient on the constant term, B is the regression coefficient(s) on the independent/predictor variable(s), X is the independent/predictor variable(s), and e is the error term. In some embodiments, the independent/predictor variables of the logistic regression model may correspond to member profile data or behavioral log data associated with members of an online social network service (where the aforementioned member profile data or behavioral log data may be encoded into numerical values and inserted into feature vectors). The regression coefficients may be estimated using maximum likelihood or learned through a supervised learning technique from the recruiting intent signature data, as described in more detail below. Accordingly, once the appropriate regression coefficients (e.g., B) are determined, the features included in a feature vector (e.g., member profile data and/or behavioral log data associated with one or more members of a social network service) may be plugged in to the logistic regression model in order to predict the probability (or "confidence score") that the event Y occurs (where the event Y may be, for example, a missing member profile attribute corresponding to a particular candidate value). In other words, provided a feature vector including various member profile data and/or behavioral features associated with members, the feature vector may be applied to a logistic regression model to determine the probability that a missing member profile attribute of a particular member corresponds to a particular candidate value. Logistic regression is well understood by those skilled in the art, and will not be described in further detail herein, in order to avoid occluding various aspects of this disclosure. The prediction module 304 may use various other prediction modeling techniques understood by those skilled in the art to generate the aforementioned confidence score. For example, other prediction modeling techniques may include other computer-based machine learning models such as a gradient-boosted machine (GBM) model, a Naïve Bayes model, a support vector machines (SVM) model, a decision trees model, and a neural network model, all of which are understood by those skilled in the art.

According to various embodiments described above, the feature data may be used for the purposes of both off-line training (for generating, training, and refining a prediction model and or the coefficients of a prediction model) and online inferences (for generating confidence scores). For example, if the prediction module 204 is utilizing a logistic regression model (as described above), then the regression coefficients of the logistic regression model may be learned through a supervised learning technique from the feature data. Accordingly, in one embodiment, the identity inference system 200 may operate in an off-line training mode by assembling the feature data into feature vectors. The feature vectors may then be passed to the prediction module 204, in order to refine regression coefficients for the logistic regression model. For example, statistical learning based on the Alternating Direction Method of Multipliers technique may be utilized for this task. Thereafter, once the regression coefficients are determined, the identity inference system 200 may operate to perform online (or offline) inferences based on the trained model (including the trained model coefficients) on a feature vector representing the feature data of a particular member of the online social network service. According to various exemplary embodiments, the off-line process of training the prediction model based on member profile data and behavioral log data may be performed periodically at regular time intervals (e.g., once a day), or may be performed at irregular time intervals, random time intervals, continuously, etc. Thus, since member profile data and behavioral log data may change over time, it is understood that the prediction model itself may change over time (based on the current member profile data and behavioral log data used to train the model).

Example Mobile Device

Figure 8:
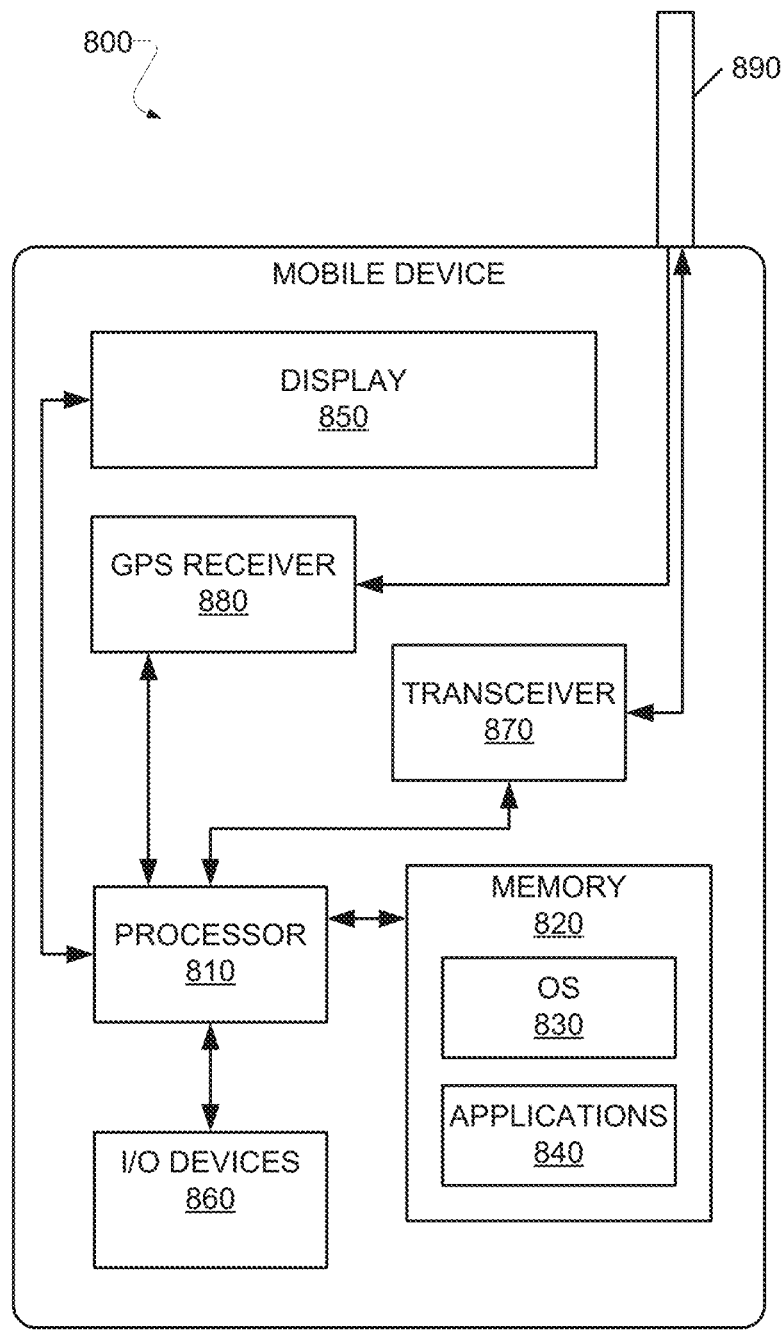
FIG. 8 illustrates an example mobile device, according to various embodiments.

FIG. 8 is a block diagram illustrating the mobile device 800, according to an example embodiment. The mobile device may correspond to, for example, one or more client machines or application servers. One or more of the modules of the system 200 illustrated in FIG. 2 may be implemented on or executed by the mobile device 800. The mobile device 800 may include a processor 810. The processor 810 may be any of a variety of different types of commercially available processors suitable for mobile devices (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory, is typically accessible to the processor 810. The memory 820 may be adapted to store an operating system (OS) 830, as well as application programs 840, such as a mobile location enabled application that may provide location based services to a user. The processor 810 may be coupled, either directly or via appropriate intermediary hardware, to a display 850 and to one or more input/output (I/O) devices 860, such as a keypad, a touch panel sensor, a microphone, and the like. Similarly, in some embodiments, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile device 800. Further, in some configurations, a GPS receiver 880 may also make use of the antenna 890 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
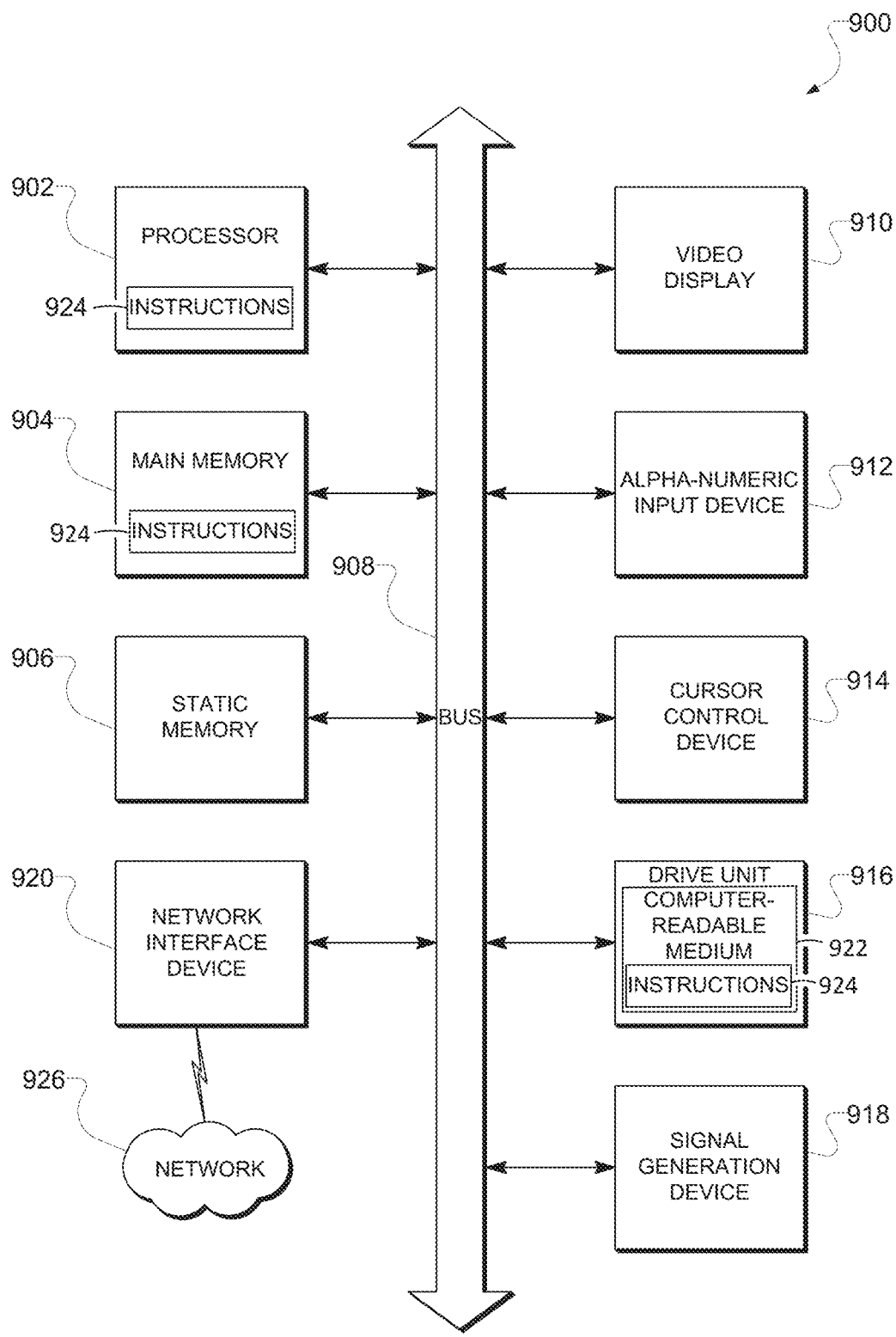
FIG. 9 is a diagrammatic representation of a machine in the example form of a computer system within which a set of instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
identifying an existing member profile attribute included in a member profile page of a particular member of an online social network service;
accessing member profile data associated with a plurality of members of the online social network service;
accessing behavioral log data associated with the members, the behavioral log data indicating interactions by the members with one or more products of the online social network service;
performing prediction modeling to verify the existing member profile attribute, using one or more processors, based on a prediction model and feature data including the member profile data and the behavioral log data, to generate a confidence score associated with the existing member profile attribute;
determining that the existing member profile attribute is inaccurate based on the generated confidence score;
receiving a search request for members having a member profile attribute corresponding to the existing member profile attribute; and
modifying search results associated with the search request to exclude the particular member based on the determination.

2. The method of claim 1, wherein the existing member profile attribute corresponds to a geographic location.

3. The method of claim 1, wherein the existing member profile attribute corresponds to an educational attribute.

4. The method of claim 1, wherein the existing member profile attribute corresponds to an employer attribute.

5. The method of claim 1, wherein the existing member profile attribute corresponds to a title.

6. The method of claim 1, wherein the existing member profile attribute corresponds to a skill.

7. The method of claim 1, wherein the prediction model is a logistic regression model.

8. The method of claim 1, wherein the prediction model is a gradient-boosted machine (GBM) model.

9. The method of claim 1, wherein the prediction model is a Naïve Bayes model.

10. The method of claim 1, wherein the prediction model is a support vector machine (SVM) model.

11. The method of claim 1, wherein the prediction model is a decision tree model.

12. The method of claim 1, wherein the prediction model is a neural network model.

* * * * *